(12) United States Patent
Timmins et al.

(10) Patent No.: US 7,448,875 B2
(45) Date of Patent: Nov. 11, 2008

(54) TELECOMMUNICATIONS CONNECTIVITY SYSTEM AND ASSOCIATED PATCH PANEL MOUNTING SYSTEM

(75) Inventors: Ian J. Timmins, Asheville, NC (US); Derrick F. Stikeleather, Swannanoa, NC (US); William B. Everette, Asheville, NC (US); Sterling Vaden, Black Mountain, NC (US); Sumio Seo, South Wallingford, VT (US); Lyudmila Z. Burtseva, Asheville, NC (US); James Yanik, Asheville, NC (US)

(73) Assignee: Superior Modular Products Incorporated, Swannanoa, NC (US)

( * ) Notice: Subject to any disclaimer, the term of this patent is extended or adjusted under 35 U.S.C. 154(b) by 0 days.

(21) Appl. No.: 11/517,826

(22) Filed: Sep. 8, 2006

(65) Prior Publication Data

US 2008/0064228 A1 Mar. 13, 2008

(51) Int. Cl.
*H01R 29/00* (2006.01)
*H02B 1/056* (2006.01)
(52) U.S. Cl. ...................................................... 439/49
(58) Field of Classification Search .................. 439/49, 439/540.1, 490; 379/326–329
See application file for complete search history.

(56) References Cited

U.S. PATENT DOCUMENTS

| | | | |
|---|---|---|---|
| 5,145,380 A | 9/1992 | Holcomb et al. | |
| D359,475 S | 6/1995 | Coffey | |
| 5,575,665 A | 11/1996 | Shramawick et al. | |
| 5,647,763 A | 7/1997 | Arnold et al. | |
| 5,944,535 A | 8/1999 | Bullivant et al. | |
| D416,908 S | 11/1999 | Whisenant | |
| 6,017,229 A | 1/2000 | Tulley et al. | |
| 6,075,784 A | 6/2000 | Frankel et al. | |
| 6,109,959 A | 8/2000 | Burlinson et al. | |
| 6,755,664 B2 * | 6/2004 | Sakamoto et al. | 439/49 |
| 6,826,280 B1 | 11/2004 | Sajadi et al. | |
| 6,853,637 B1 | 2/2005 | Norrell et al. | |
| 6,934,278 B1 | 8/2005 | Champa et al. | |
| 6,993,011 B1 | 1/2006 | Kaplan et al. | |
| 2001/0005652 A1 | 6/2001 | Brownell et al. | |
| 2005/0220059 A1 | 10/2005 | DelRegno et al. | |

FOREIGN PATENT DOCUMENTS

WO  WO 2005/104567 A1  11/2005

OTHER PUBLICATIONS

PCT International Search Report; PCT/US2007/077876; dated Feb. 14, 2008.

* cited by examiner

*Primary Examiner*—Javaid Nasri
(74) *Attorney, Agent, or Firm*—Carter & Schnedler, P.A.

(57) ABSTRACT

A telecommunications connectivity system including a patch panel comprising a plurality of ports, each port including first and second electrical terminals, the first electrical terminal enabling at least one data communications standard not enabled by the second electrical terminal. The telecommunications connectivity system also includes a terminal selection system including a terminal selector that houses an electrical connector. The terminal selector may be installed in one of the ports such that the electrical connector connects to either the first or second electrical terminal, as preselected. The telecommunications connectivity system also includes a wall receptacle system electrically connected to each of the ports, the wall receptacle system including first and second jacks, the first jack enabling at least one data communications standard not enabled by the second jack.

1 Claim, 9 Drawing Sheets

TELECOMMUNICATIONS CONNECTIVITY SYSTEM AND ASSOCIATED PATCH PANEL MOUNTING SYSTEM

CROSS-REFERENCE TO RELATED APPLICATIONS

Not Applicable

BACKGROUND OF THE INVENTION

This invention relates to a telecommunications connectivity system. More particularly, it relates to a telecommunications connectivity system, including a patching system and a wall receptacle system.

SUMMARY OF THE INVENTION

In accordance with one form of this invention there is provided a patch panel mounting system, including a patch panel having a faceplate and substantially parallel upper and lower major edges. A first and second pair of ears are provided. The first pair of ears is integrated with the faceplate or is attached to the faceplate adjacent to the upper major edge of the patch panel. The second pair of ears is integrated with the faceplate or attached to the faceplate adjacent to the lower major edge of the patch panel. Each of the ears in the first pair of ears defines a hole for receiving a fastener for mounting the patch panel to a rack. Each of the ears in the second pair of ears is hinged to a bracket defining two spaced apart holes for receiving fasteners for mounting the patch panel to a rack. Each bracket includes a tab adjacent to the lower major edge of the patch panel. When the fasteners received by the holes defined by the first pair of ears of the patch panel are disengaged, the patch panel may be articulated to rest against the tabs of the brackets.

DETAILED DESCRIPTION

The invention described and claimed herein encompasses a telecommunications connectivity system and an associated patch panel mounting system. An embodiment of the telecommunications connectivity system of the present invention includes (1) a patching system carrying a plurality of terminal selection systems, and (2) a wall receptacle system.

Figure 1:
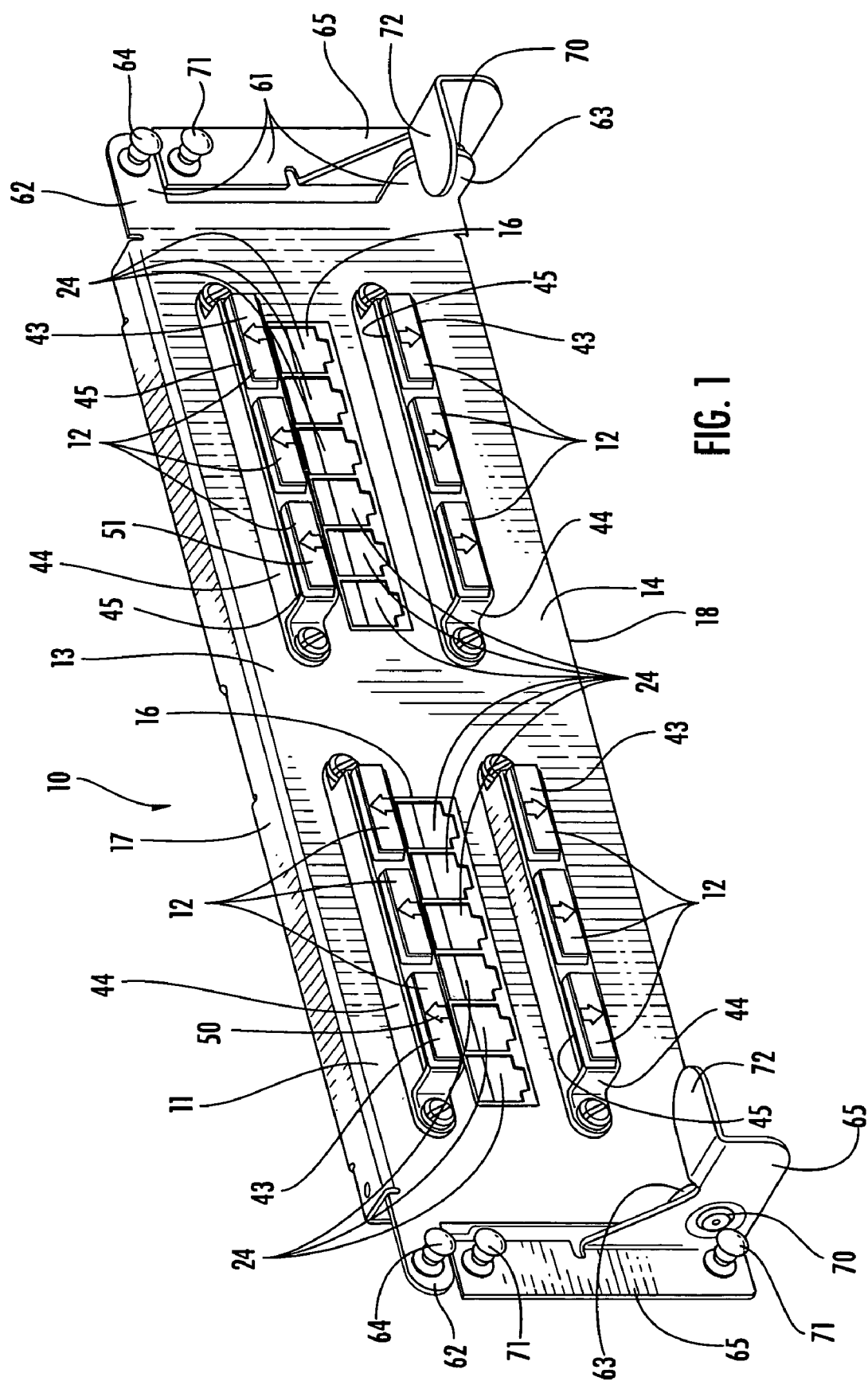
FIG. 1 is an anterior isometric view of a patching system according to an embodiment of the telecommunications connectivity system of the invention and a patch panel mounting system according to an embodiment of the invention.
Figure 2:
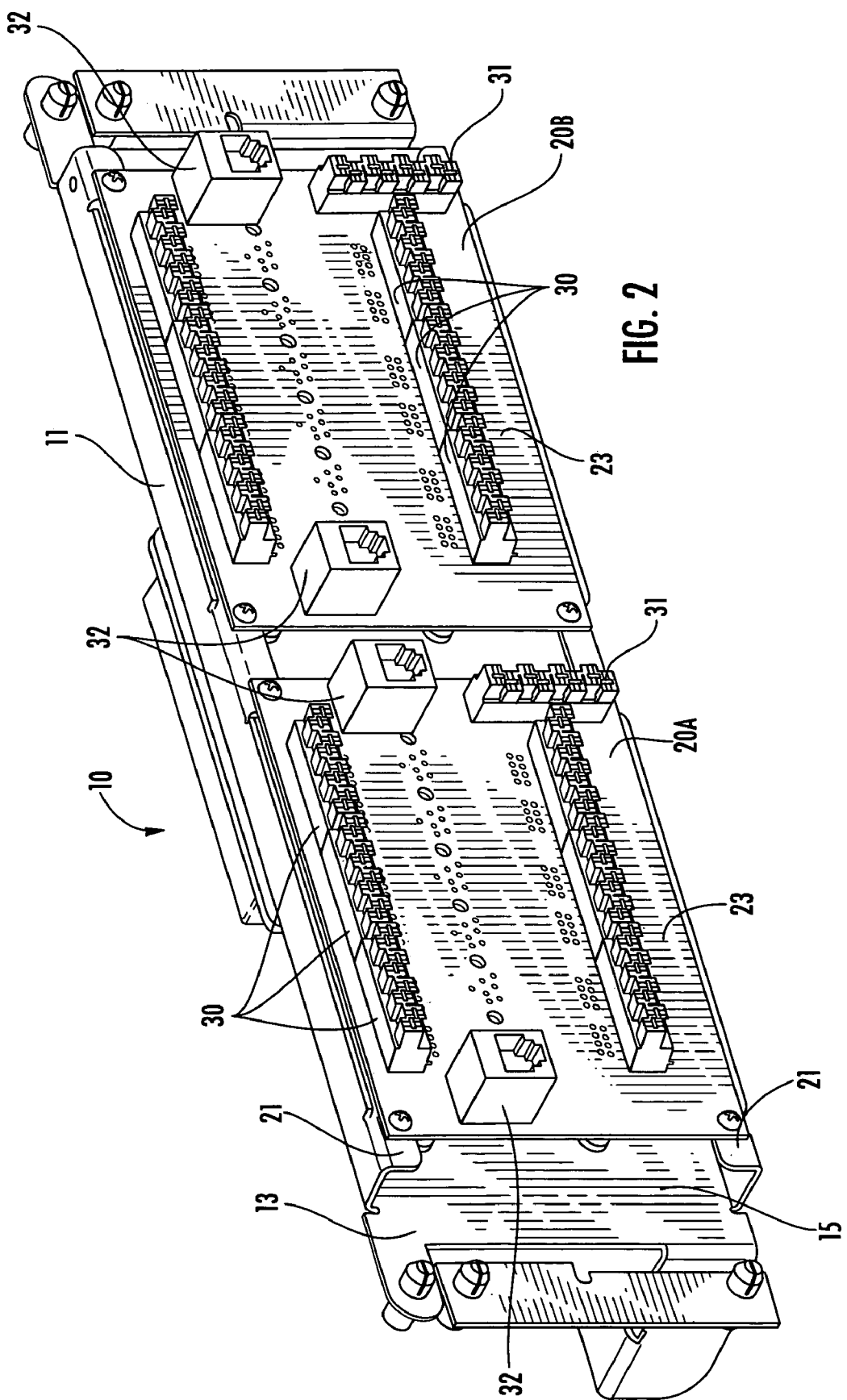
FIG. 2 is a posterior isometric view of the patching system and patch panel mounting system shown in FIG. 1.

A patching system according to the disclosed embodiment of the telecommunications connectivity system of the invention is shown broadly at reference numeral 10 in FIG. 1. The patching system 10 includes a patch panel 11 and a plurality of terminal selection systems 12. The patch panel 11 has substantially parallel upper and lower major edges 17, 18 and is comprised of a patch panel faceplate 13 with an anterior face 14 and a posterior face 15 (FIG. 2). The faceplate defines two large, substantially rectangular jack openings 16 (FIG. 1) and twelve small, substantially rectangular terminal selector openings (obscured by terminal selection systems in FIG. 1). Three terminal selector openings are immediately above each of the two jack openings 16 and three terminal selector openings are immediately below each of the two jack openings 16.

Figure 3:
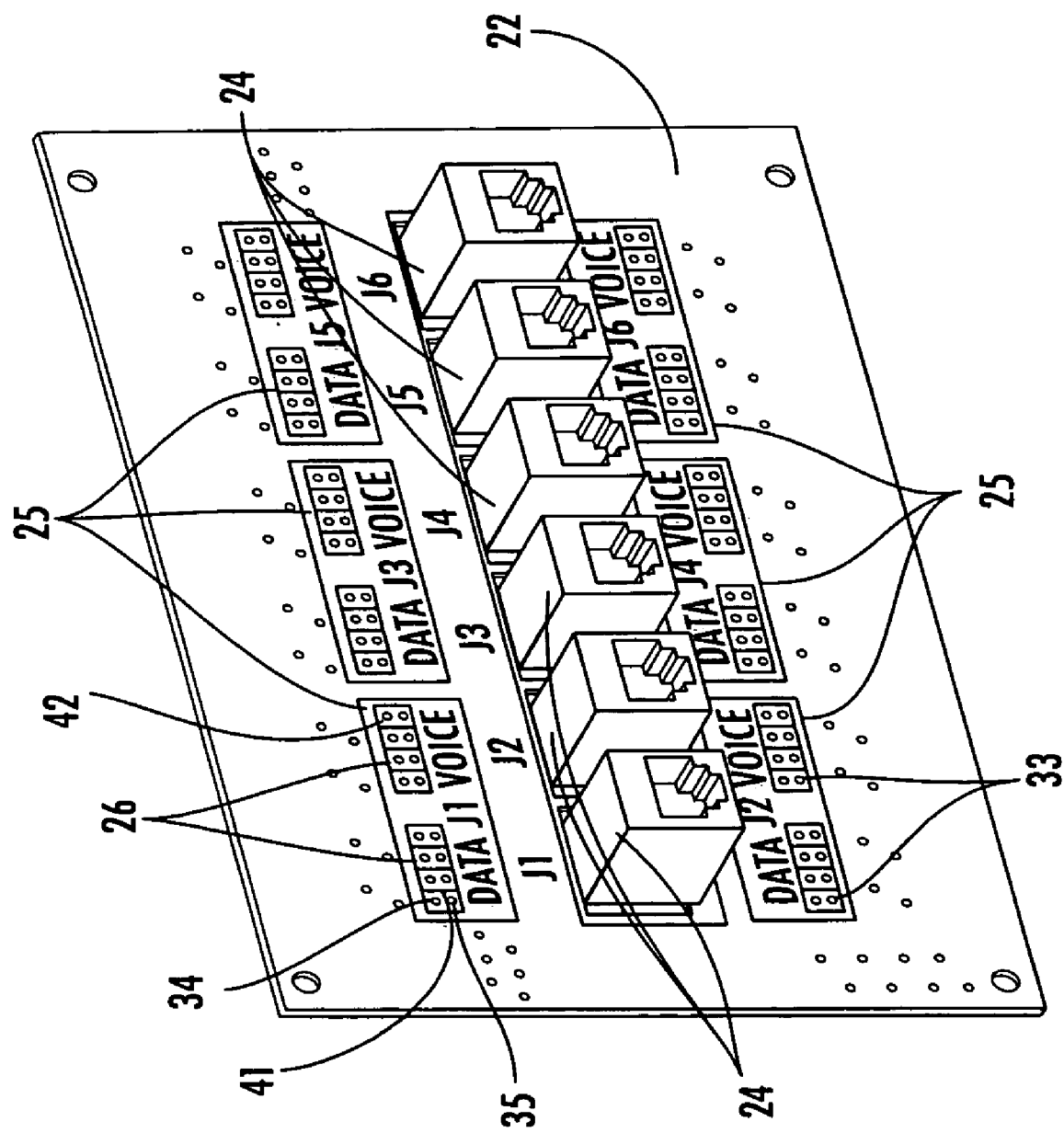
FIG. 3 is an anterior isometric view of a patch panel printed circuit board.

Two printed circuit boards 20A, 20B are mounted to rails 21 extending from the posterior face 15 of the faceplate 13. These printed circuit boards 20A, 20B are hereinafter sometimes referred to collectively as "panel PCBs" and individually as "a panel PCB." Each of the panel PCBs 20A, 20B has an anterior face 22 (FIG. 3) and a posterior face 23 (FIG. 2). Six eight-position, eight-conductor jacks 24 wired in accordance with the TIA T568A or T568B standard are mounted to the anterior face 22 of each panel PCB 20A, 20B. These jacks 24 hereinafter sometimes referred to collectively as "panel jacks" and individually as a "panel jack."

Also mounted on the anterior face 22 of each panel PCB 20A, 20B are six pairs 25 of electrical terminals 26; in the disclosed embodiment of the invention these terminals are eight-pin headers. These terminals 26 are hereinafter sometimes referred to collectively as "panel terminals" and individually as "a panel terminal," and the pairs 25 of panel terminals 26 are hereinafter sometimes referred to collectively as "panel terminal pairs" and individually as "a panel terminal pair." Each jack 24 and panel terminal pair 25 is electrically connected to an insulation displacement punchdown block 30 (FIG. 2) mounted on the posterior face 23 of the panel PCB 20A, 20B. These punchdown blocks 30 are hereinafter sometimes referred to collectively as the "panel IDCs" and individually as "the panel IDC."

An additional insulation displacement punchdown block 31 is mounted on the posterior face 23 of each panel PCB 20A, 20B to receive cabling (not shown) over which plain old telephone service ("POTS") is provided. This punchdown block 31 is hereinafter referred to as "the telco IDC." Finally, two RJ11 jacks 32 are mounted on the posterior face 23 of each panel PCB 20A, 20B and electrically connected to the telco IDC 31. These RJ11 jacks 32 enable panel PCBs 20A, 20B that are not directly connected to POTS to receive POTS communications. For instance, POTS may be directly connected to the telco IDC 31 of a first panel PCB 20A of the two panel PCBs 20A, 20B in the patch panel 11 and a length of cabling that terminates in RJ11 plugs at both ends (not shown) may then connect one of the RJ11 jacks 32 on the first panel PCB 20A to one of the RJ11 jacks 32 on the second panel PCB 20B of the two panel PCBs 20A, 20B, thereby extending POTS to the second panel PCB 20B.

Each panel jack 24 and its corresponding panel terminal pair 25, panel IDC 30, and four conductor pairs (not shown) are hereinafter referred to collectively as a "panel port." The four conductor pairs in each panel port are wired in accordance with the TIA T568A or TIA T568B standard. Thus, if data communications through the panel port are in accordance with the 10 megabit-per-second ("Mbps") and 100 Mbps standards (collectively "10/100"), conductor pair 1 carries voice communications over POTS, conductor pairs 2 and 3 carry data communications, and conductor pair 4 provides a secondary voice communications line over POTS. If data communications through the panel port are in accordance with the 1000 Mbps or "gigabit" standard, all four conductor pairs carry data communications and no voice communications occur.

Figure 4:
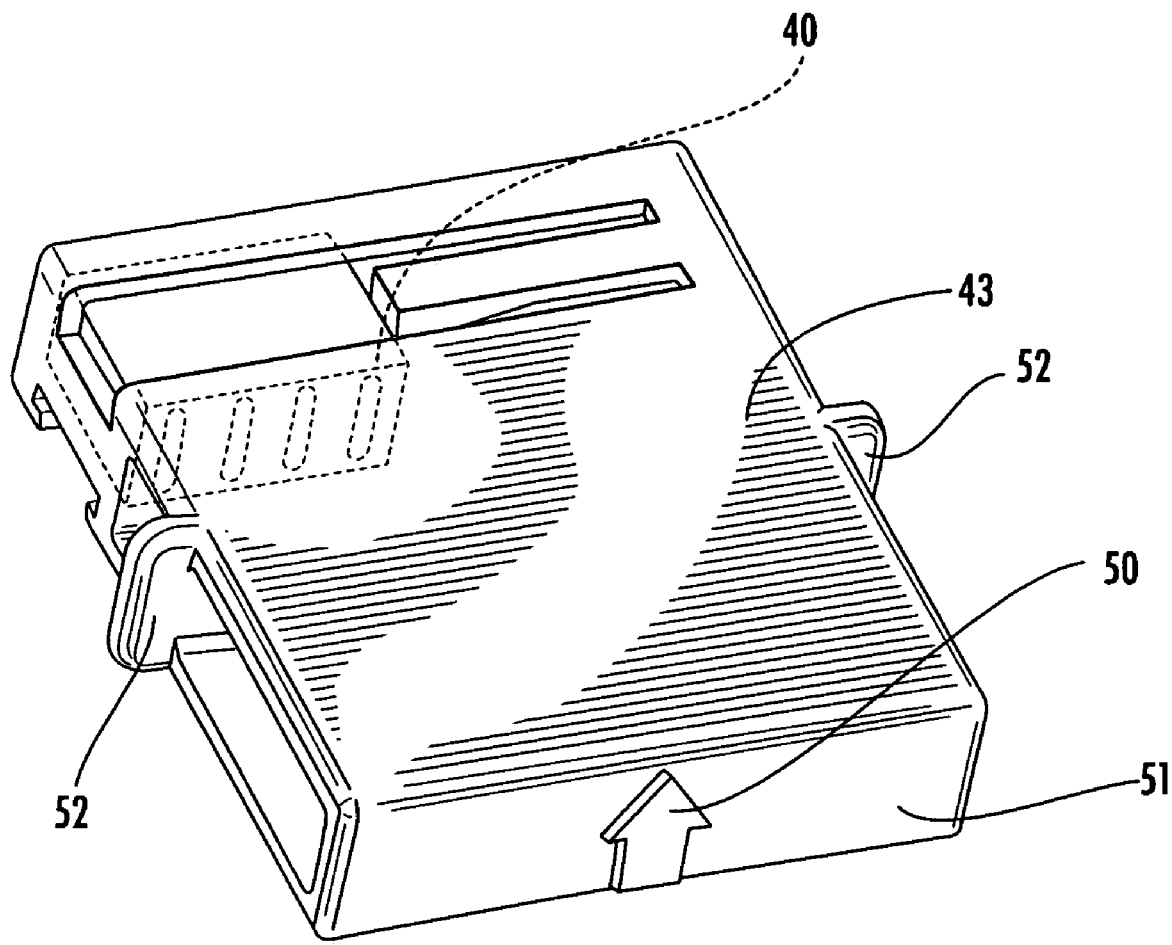
FIG. 4 is an anterior isometric view of a terminal selector according to an embodiment of the telecommunications connectivity system of the invention, with the jumper housed by the terminal selector shown in phantom.

In the disclosed embodiment of the invention, conductor pairs 2 and 3 in each panel port, along which data communications always occur, are hardwired. Thus, the panel terminal pairs 25 do not affect communications through conductor pairs 2 and 3. However, in each panel port, signal flow along conductor pairs 1 and 4 is interrupted by a panel terminal pair 25. In the disclosed embodiment of the invention, each panel terminal 26 in each panel terminal pair 25 has eight pins 33, two pins 33 for each conductor in conductor pairs 1 and 4. Signal flow may occur through a panel terminal 26 if the top row 34 of four pins 33 on the panel terminal 26 are electrically connected to the bottom row 35 of four pins 33 on the panel terminal 26 such that each pin 33 in the top row 34 is connected to the pin 33 immediately below it in the bottom row 35. These connections may be achieved by an electrical connector such as a four-conductor jumper 40 (FIG. 4). An installer or user chooses to apply the jumper 40 to the panel terminal 26 in each panel terminal pair 25 that corresponds to the speed standard of the data communications that will be flowing through the panel port. If the panel port needs to carry gigabit standard data communications, the jumper 40 is applied to the left-hand panel terminal 41 in the panel terminal pair 25, thereby utilizing conductor pairs 1 and 4 for data communications in conjunction with the data communications hardwired through conductor pairs 2 and 3. If the panel port needs to carry 10/100 standard data communications, the jumper 40 is applied to the right-hand panel terminal 42 in the panel terminal pair 25, thereby utilizing conductor pairs 1 and 4 for primary and secondary voice communications lines over POTS while 10/100 data communications are hardwired through conductor pairs 2 and 3.

Figure 5:
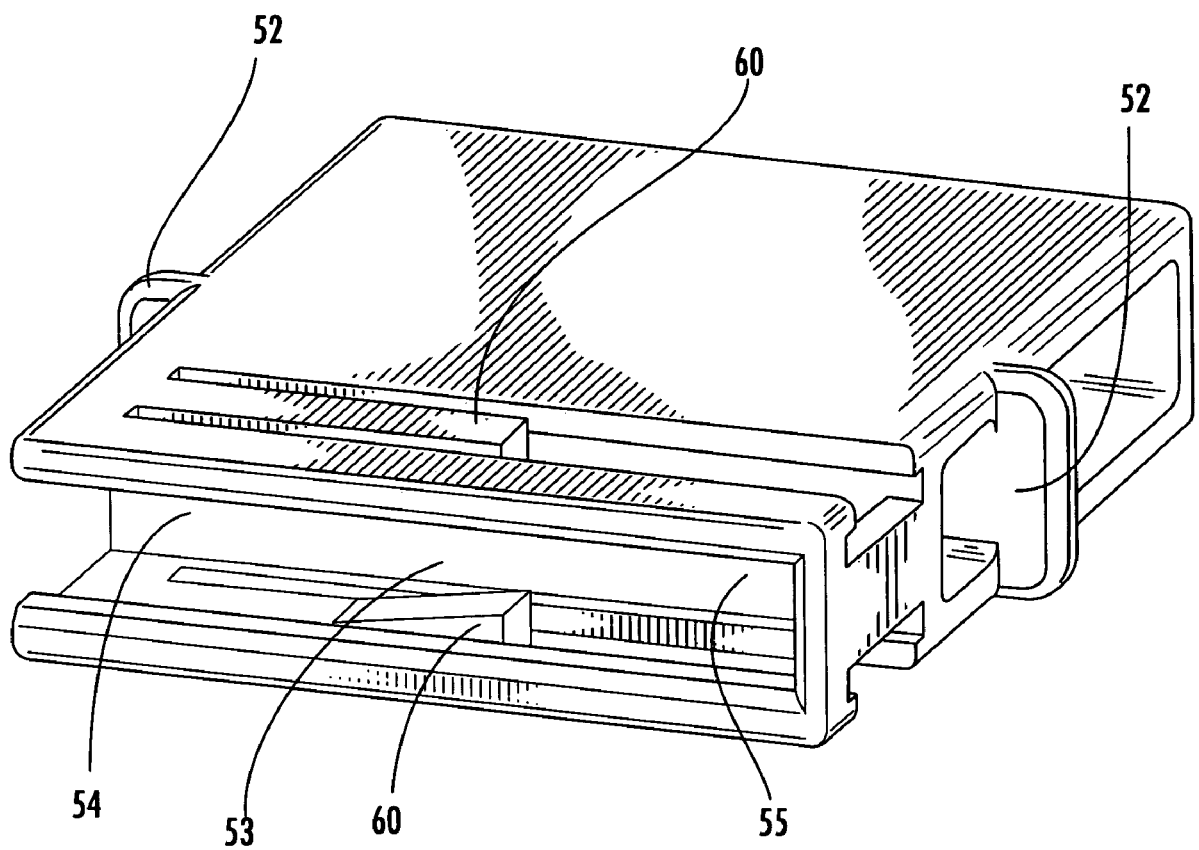
FIG. 5 is a posterior isometric view of the terminal selector shown in FIG. 4, with the jumper removed.

In the disclosed embodiment of the invention, the jumper 40 is a component of each terminal selection system 12. Each terminal selection system 12 also comprises a terminal selector 43 (FIGS. 1, 4, and 5) and a terminal selector guard 44 (FIG. 1). Each terminal selector 43 is a plastic housing for carrying the jumper 40. As shown in FIGS. 4 and 5, the terminal selector 43 comprises opposing protruding tabs 52. The tabs 52 are oriented such that, when the terminal selector 43 is installed and the terminal selector guard 44 is installed over the terminal selector 43, the tabs 52 and the terminal selector guard 44 prevent unintentional or unauthorized removal of the terminal selector 43 from the patch panel 11. The terminal selector 43 also defines an opening 53 (FIG. 5) for receiving the panel terminal pair 25. A shallow portion 54 of the opening 53 is configured to receive the panel terminal 26 that is not being engaged by the jumper 40, while a deep portion 55 of the opening 53 is configured to receive the jumper 40 and the panel terminal 25 engaging the jumper 40. Jumper stays 60 extend horizontally from the shallow portion 54 of the opening 53 toward the deep portion 55 of the opening 53 in order to keep the jumper 40 in place in the deep portion 55 of the opening 53. Each terminal selector guard 44 defines three openings 45 that, when the terminal selector guard 44 is installed, are in substantial alignment with the terminal selector openings in the faceplate 13 of the patch panel 11.

To be installed, each terminal selector 43 is inserted through the corresponding terminal selector opening in the faceplate 13 of the patch panel 11 until the jumper 40 in the terminal selector 43 fully engages one of the panel terminals 26 in the corresponding panel terminal pair 25. The terminal selector guard 44 is then installed over the terminal selectors 43 in order to prevent unintentional or unauthorized removal of the terminal selectors 43 from the patch panel 11, as described above.

The terminal selector 43 may be in either of the two available horizontal positions depending on which panel terminal 26 in the panel terminal pair 25 is being selected relative to the corresponding jack 24 in the panel port. To assist with proper positioning of the terminal selector 43, a visual indicator such as an arrow 50 is provided on a readily visible surface 51 of the terminal selector 43. In the disclosed embodiment of the invention, if the terminal selector 43 is positioned such that the arrow 50 is pointing toward the upper major edge 17 of the patch panel 11, the terminal selector 43 and the jumper 40 housed therein are positioned to engage the left-hand panel terminal 41 in the panel terminal pair 25, which is configured to enable gigabit data communications, as described above. If the terminal selector 43 is positioned such that the arrow 50 is pointed toward the lower major edge 18 of the patch panel 11, the terminal selector 43 and the jumper 40 housed therein are positioned to engage the right-hand panel terminal 42 in the panel terminal pair 25, which is configured to enable 10/100 data communications together with voice communications, as described above.

Accompanying the patching system 10 is a patch panel mounting system 61 (FIG. 1). Specifically, the faceplate 13 of the patch panel 11 is provided with first and second pairs of ears 62, 63. The first pair of ears 62 is either attached to or integral with the faceplate 13 of the patch panel 11 at the corners of the faceplate 13 that are proximal to the upper major edge 17 of the patch panel 11. Each of the ears in the first pair of ears 62 defines a hole through which a fastener 64 is inserted. The fasteners 64 are configured to attach the first pair of ears 62 to a patch panel rack (not shown). The second pair of ears 63 are either attached to or integral with the faceplate 13 of the patch panel 11 at the corners of the faceplate 13 that are proximal to the lower major edge 18 of the patch panel 11. A bracket 65 is attached by hinges 70 to each of the ears in the second pair of ears 63. Each of the brackets 65 defines two spaced-apart holes through which fasteners 71 (three of four are visible in FIG. 1) are inserted. The fasteners 71 are configured to attach the brackets 65 to a patch panel rack. Each of the brackets 65 comprises a tab 72.

The patch panel mounting system 61 enables a user to access the posterior face 15 of the faceplate 13 of the patch plate and the posterior faces 23 of the panel PCBs 20A, 20B (FIG. 2) without removing the patch panel 11 from the patch panel rack (not shown). Specifically, a user may remove the fasteners 64 from the first pair of ears 62 of the faceplate 13 and, by virtue of the hinges 70, articulate the patch panel 11 away from the patch panel rack until the anterior face 14 of the faceplate 13 of the patch panel 11 rests against the tabs 72 of the brackets 65. After access to the posterior faces 15, 23 of the faceplate 13 and the panel PCBs 20A, 20B is no longer needed, the user may articulate the patch panel 11 back toward the patch panel rack and refasten the first pair of ears 62 of the faceplate 13 to the rack.

Figure 6:
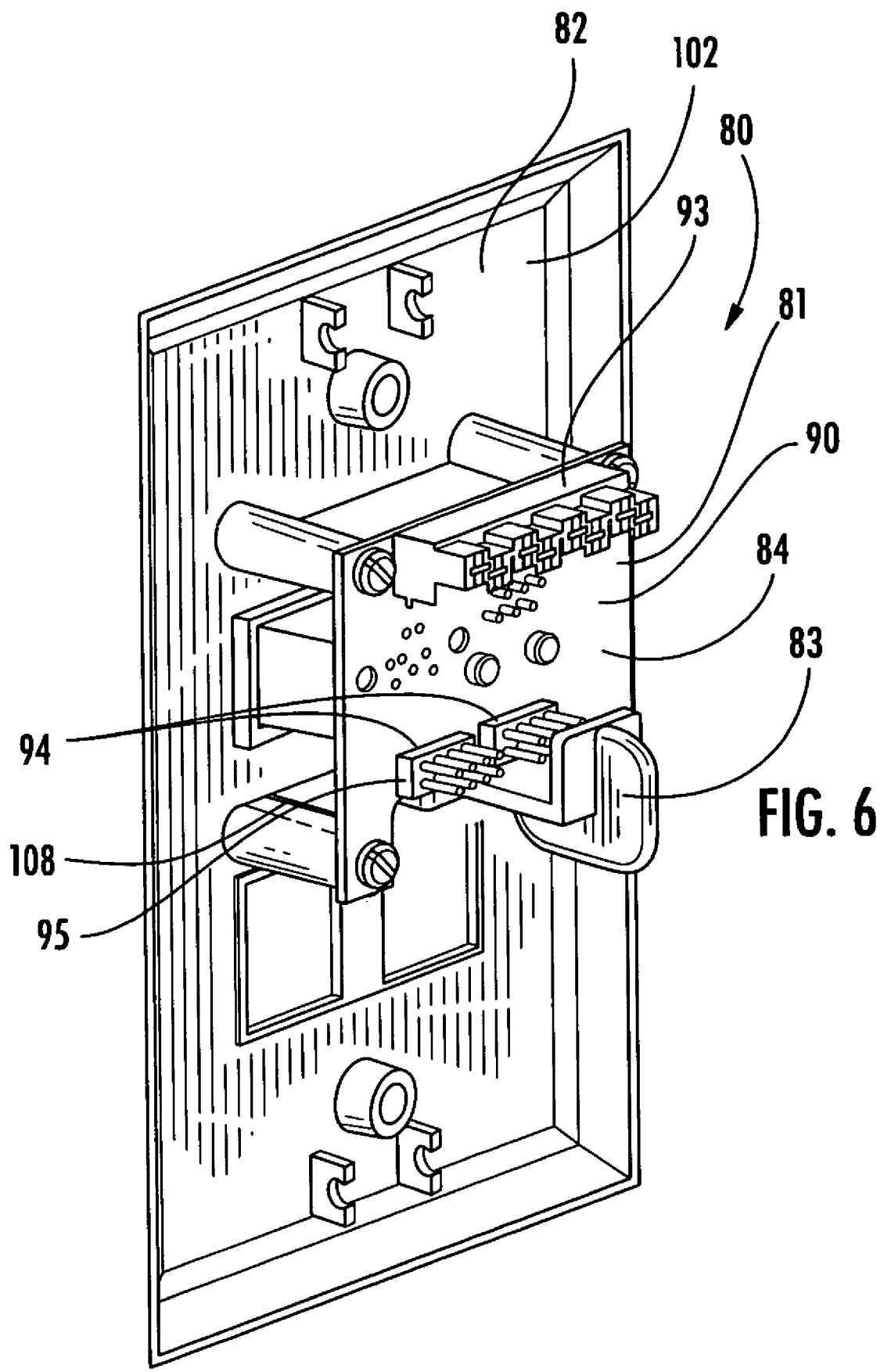
FIG. 6 is a posterior isometric view of a wall receptacle system in accordance with an embodiment of the telecommunications connectivity system of the invention.
Figure 7:
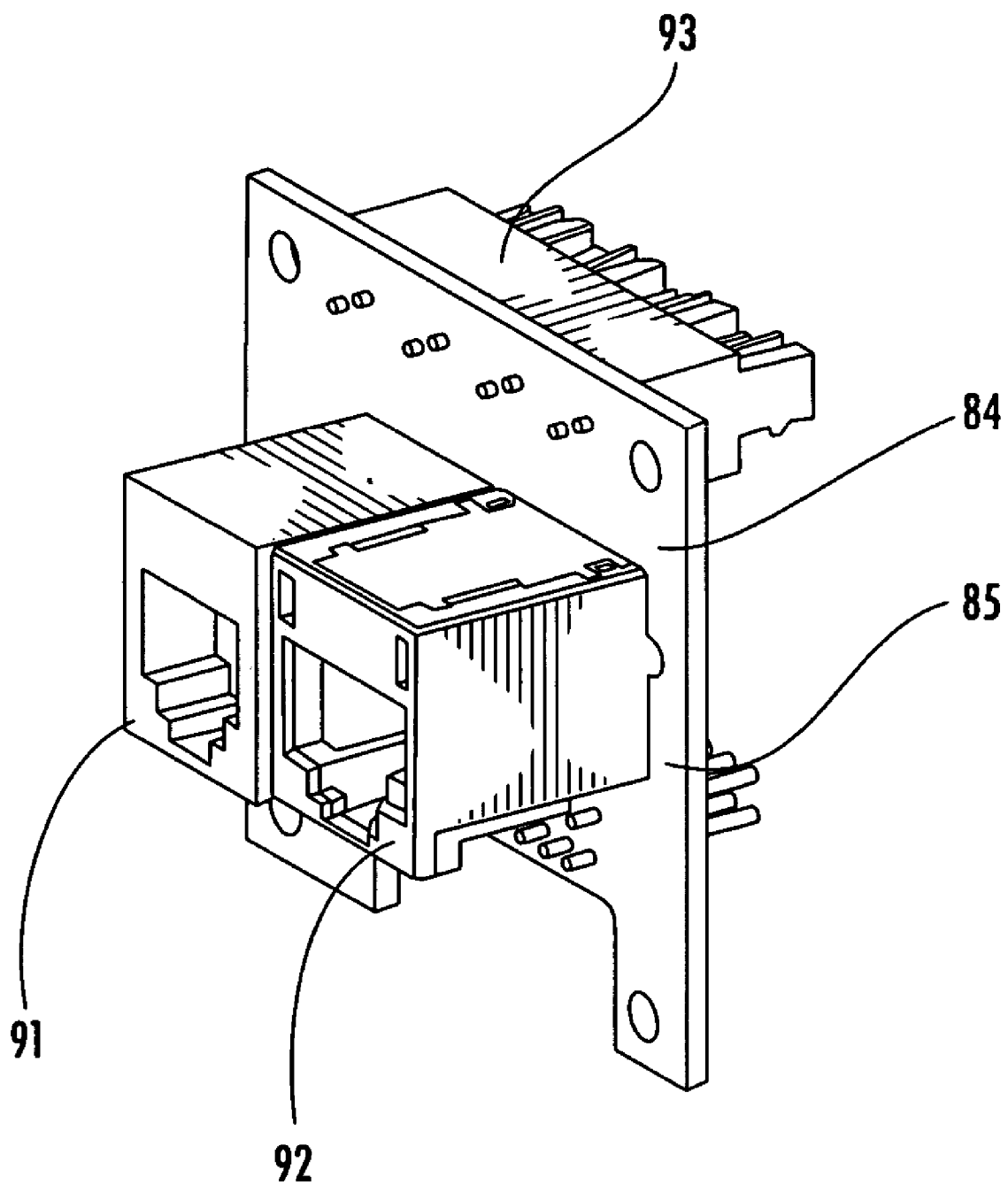
FIG. 7 is an anterior isometric view of a wall receptacle printed circuit board.

Turning now to FIG. 6, a wall receptacle system according to an embodiment of the telecommunications connectivity system of the invention is shown broadly at reference numeral 80. The wall receptacle system 80 includes a jack assembly 81, a wall receptacle faceplate 82, and a shutter 83. The jack assembly 81 is attached to the wall receptacle faceplate 82. The jack assembly 81 comprises a wall receptacle printed circuit board 84 ("the wall PCB") having an anterior face 85 (FIG. 7) and a posterior face 90 (FIG. 6). An RJ11 jack 91 wired for voice communications over POTS and an eight-position, eight-conductor jack 92 wired for data communications in accordance with the TIA T568A or TIA T568B standard are mounted to the anterior face 85 of the wall PCB 84. An electrical connector such as an insulation displacement punchdown block 93 is mounted to the posterior face 90 of the wall PCB 84 along with a pair 94 of electrical wall terminals 95, 100, each wall terminal 95, 100 comprising an eight-pin header. An electrical connector such as a four-conductor jumper (not shown) is installed on the wall terminal 95, 100 that corresponds with the data communications standard for the particular wall receptacle system 80 in question. If data communications through the wall receptacle system 80 are according to the gigabit standard, the jumper is installed on the left-hand wall terminal 95, thereby activating the TIA T568A/B jack 92 on the jack assembly 81. If data communications through the wall receptacle system 80 are according to the 10/100 standard, thereby also allowing voice communications through the wall receptacle system 80 over POTS, the jumper is installed on the right-hand wall terminal 100 and the RJ11 jack 91 on the jack assembly 91 is activated. The jumper in the wall receptacle system 80 accomplishes activation of the wall terminals 95, 100 in the same manner described above that the jumpers 40 in the patching system 10 accomplish activation of the panel terminals 41, 42.

Figure 8:
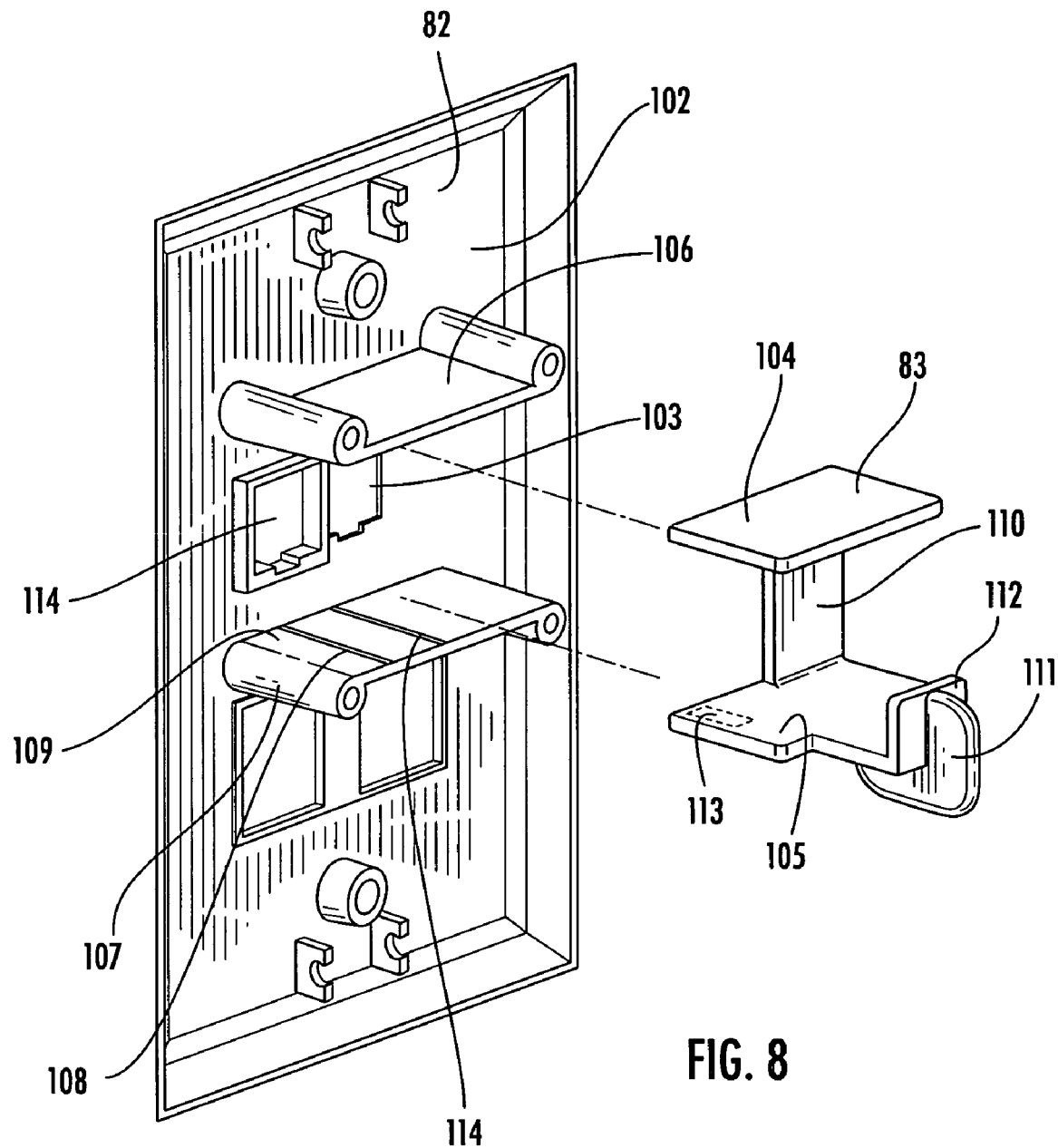
FIG. 8 is a posterior exploded view of the wall receptacle system shown in FIG. 6 with the wall receptacle printed circuit board removed.
Figure 9:
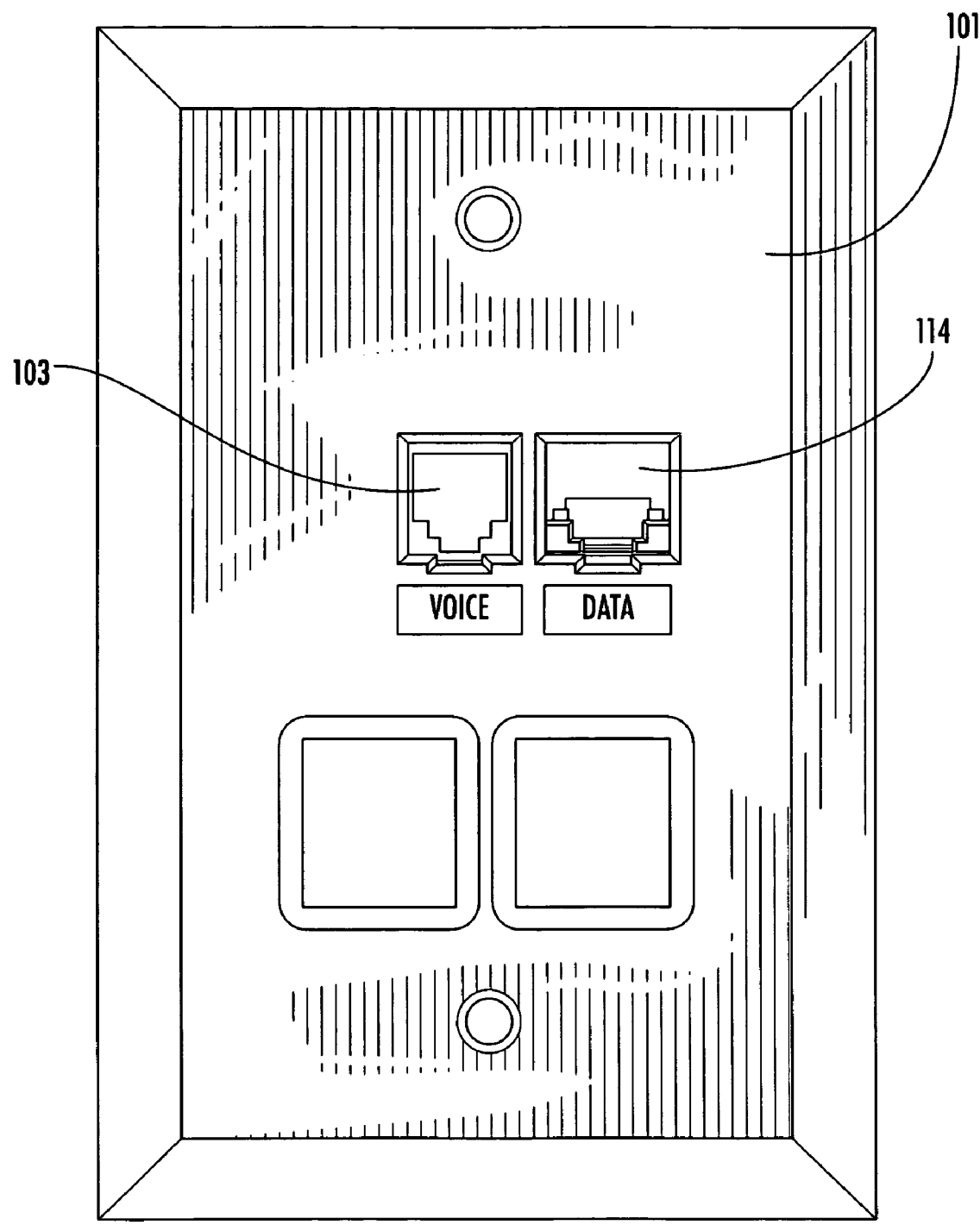
FIG. 9 is an anterior plan view of a wall receptacle faceplate.

Looking at FIG. 8, the wall receptacle faceplate 82 and the shutter 83 of the wall receptacle system 80 are shown. The wall receptacle faceplate 82 comprises anterior and posterior faces 101, 102 and defines openings 103, 114 to provide user access to the RJ11 jack 91 and the TIA T568A/B jack 92 of the jack assembly 81 through the wall receptacle faceplate 82. Upper and lower substantially parallel, spaced-apart shutter guides 106, 107 extend from the posterior face 102 of the wall receptacle faceplate 82. Two substantially parallel grooves 108, 115 are defined in an upper surface 109 of the lower shutter guide 107. The shutter 83 comprises upper and lower opposing major plates 104, 105 connected by a vertical access prevention panel 110. A handle tab 111, a backstop 112, and a positioning fin 113 (in phantom) are integral with the lower major plate 102 of the shutter.

The wall receptacle system 80 may be assembled as follows. The jack assembly 81 is placed between the upper and lower major plates 104, 105 of the shutter 83 such that the jack assembly 81 rests on the lower major plate 105 and between the backstop 112 and vertical access prevention panel 110 of the shutter 83. The shutter 83, with the jack assembly 81 resting thereon, is then placed between the shutter guides 106, 107 of the wall receptacle faceplate 82 with one of the grooves 108, 115 in the lower shutter guide 107 receiving the positioning fin 113 of the shutter 83. The wall PCB 84 of the jack assembly 81 may then be fastened to the shutter guides 106, 107 to complete assembly of the wall receptacle system 80.

The wall receptacle faceplate 82 and the shutter 83 help form a jack selection system as follows. After assembly of the wall receptacle system 80, a user or installer may grasp the shutter 83 by the handle tab 111 and position the shutter 83 such that the vertical access prevention panel 110 of the shutter 83 blocks the opening 103 in the wall receptacle faceplate 82 that is associated with the jack 91, 92 of the jack assembly 81 that is not in use. Thus, if the wall receptacle system 80 is being configured for data communications according to the gigabit standard, the shutter 83 may be moved to the right (when looking at the posterior face 102 of the wall receptacle faceplate 82) until the positioning fin 113 rests in the corresponding groove 115 in the lower shutter guide 107, thereby blocking access to the RJ11 jack 91 and leaving the TIA T568A/B jack 92 accessible through the corresponding opening 114 in the wall receptacle faceplate 82. Or, if the wall receptacle system 80 is being configured for voice communications over POTS and/or data communications according to the 10/100 standard, the shutter 83 may be moved to the left (when looking at the posterior face 102 of the wall receptacle faceplate 82) until the positioning fin 113 rests in the corresponding groove 108 in the lower shutter guide 107, thereby blocking access to the TIA T568A/B jack 92 and leaving the RJ11 jack 91 accessible through the corresponding opening 103 in the wall receptacle faceplate 82.

The four-conductor jumpers utilized in the illustrated embodiments of the patching system and wall receptacle system of the telecommunications connectivity system of the invention are Part No. MNT-104-BK-G distributed by Samtec, Inc., which has an office in New Albany, Ind. USA and a web site at www.samtec.com ("Samtec"). The eight-pin headers utilized in the illustrated embodiments of the patching system and wall receptacle system of the telecommunications connectivity system of the invention are Part No. MTSW-104-08-G-D-300, also distributed by Samtec.

The telecommunications connectivity system of the present invention enables data communications standards and voice communications availability to be selected on a panel port by panel port basis, as one of ordinary skill in the art can discern from the above description of an embodiment of the invention. As a result, the invention allows multiple wall receptacles carrying various different standards of data communications to be wired from a single patch panel. More specifically, routers and/or modems that provide differing standards of data communications may be connected to the jacks of a single patch panel so long as the terminal selection systems in the patching system and the jumpers and shutters in the associated wall receptacle systems are oriented to enable throughput of the respective standards of data communications selected for the jacks.

For instance, routers and/or modems providing gigabit data communications could be connected to five of the jacks on the patch panel while the remaining seven jacks on the patch panel are connected to routers and/or modems providing 10/100 data communications. With the terminal selection systems in the five gigabit ports configured to enable gigabit communications (in the disclosed embodiment, by orienting the corresponding terminal selectors to have arrows pointing upward) and the terminal selection systems in the seven 10/100 ports configured to enable 10/100 communications (in the disclosed embodiment, by orienting the corresponding terminal selectors to have arrows pointing downward), with the jumpers in the wall receptacle systems oriented accordingly (in the disclosed embodiment, on the left-hand wall terminals for gigabit communications and on the right-hand wall terminals for 10/100 communications), and with the shutters in the wall receptacle systems oriented accordingly (in the disclosed embodiment, to the right for gigabit communications and to the left for 10/100 communications), five gigabit wall receptacles and seven 10/100 wall receptacles may be wired from the single patch panel. In this way, rooms requiring gigabit communications may receive gigabit receptacles and rooms only requiring 10/100 communications and/or requiring voice communications may receive 10/100 receptacles. Or a single room requiring both gigabit and voice communications may receive a combination of gigabit and 10/100 receptacles.

In the disclosed embodiment of the invention, the cabling (not shown) between the patching system 10 and the wall receptacle system 80 is eight-conductor twisted-pair copper cabling that complies with Category 5, Category 5e, and/or Category 6 specifications. However, as cabling standards improve to accommodate increased data communications rates, improved cabling may be employed without departing from the scope of the invention.

The patch panel could be configured to provide throughput of any mix of gigabit and 10/100 signals necessary to accommodate the signals from the available routers and/or modems (e.g., two gigabit ports and ten 10/100 ports, eight gigabit ports and four 10/100 ports, etc.). If more than twelve ports are needed, multiple patch panels may be utilized; in such a case, still only one voice communications signal over POTS would be necessary, as the patch panels could be daisy-chained together as described above to provide throughput of a single voice signal. However, if multiple voice communications signals over POTS are desired, each patch panel can carry two different voice signals (one through each of the two panel PCBs on the patch panel) and additional patch panels may be added to carry additional voice signals as desired.

As the twelve-port patch panel described herein is merely one embodiment of the patch panel of the telecommunications connectivity system of the invention, patch panels with varying numbers of ports may be utilized in the telecommunications connectivity system without departing from the scope of the invention. In addition, other data standard selection hardware beyond that utilized in the disclosed embodiment of the invention (i.e., hardware other than the terminal selectors, four-conductor jumpers, eight-pin headers, and shutters) may be employed without departing from the scope of the invention. Finally, as data communications standards and the associated hardware continue to provide higher and higher bit rates (e.g., 10 gigabit), the hardware of the invention may be modified to accommodate such rates without departing from the scope of the invention.

A telecommunications connectivity system and associated patch panel mounting system are described above. Various details of the invention may be changed without departing from its scope. Furthermore, the foregoing description of embodiments of the invention and the best mode for practicing the invention are provided for the purpose of illustration only and not for the purpose of limitation—the invention being defined by the claims.

What is claimed is:

1. A patch panel mounting system, comprising:
a patch panel comprising a faceplate and substantially parallel upper and lower major edges;
first and second pairs of ears, the first pair of ears integrated with the faceplate or attached to the faceplate adjacent to the upper major edge of the patch panel, and the second pair of ears integrated with the faceplate or attached to the patch panel adjacent to the lower major edge of the patch panel;
each of the ears in the first pair of ears defining a hole for receiving a fastener for mounting the patch panel to a rack;
each of the ears in the second pair of ears being hinged to a bracket defining two spaced-apart holes for receiving fasteners for mounting the patch panel to a rack, each bracket comprising a tab adjacent to the lower major edge of the patch panel;
wherein when the fasteners received by the holes defined by the first pair of ears of the patch panel are disengaged, the patch panel may be articulated to rest against the tabs of the brackets.

* * * * *